United States Patent [19]
Kroiss et al.

[11] Patent Number: 5,435,130
[45] Date of Patent: Jul. 25, 1995

[54] VEHICLE CATALYST EXHAUST SYSTEM FOR AN INTERNAL-COMBUSTION ENGINE

[75] Inventors: Hugo Kroiss, Gröbenzell; Christian Treml, München, both of Germany

[73] Assignee: Bayerische Motoren Werke AG, Germany

[21] Appl. No.: 116,830

[22] Filed: Sep. 7, 1993

[30] Foreign Application Priority Data

Sep. 4, 1992 [DE] Germany .................. 42 29 595.5

[51] Int. Cl.6 .............................................. F01N 3/36
[52] U.S. Cl. ........................................ 60/300; 60/303; 417/402; 417/225
[58] Field of Search ............... 60/284, 286, 303, 300; 417/402, 391, 225

[56] References Cited

U.S. PATENT DOCUMENTS

| | | | |
|---|---|---|---|
| 3,333,425 | 8/1967 | Hemard | 417/225 |
| 3,761,229 | 9/1973 | Schwartz | 60/300 |
| 3,868,819 | 3/1975 | Knapp | 60/284 |
| 5,067,467 | 11/1991 | Hill | 123/525 |
| 5,211,009 | 5/1993 | Houben | 60/286 |

FOREIGN PATENT DOCUMENTS 784122 10/1957 United Kingdom ............... 60/39.48

*Primary Examiner*—Douglas Hart
*Attorney, Agent, or Firm*—Evenson, McKeown, Edwards & Lenahan

[57] ABSTRACT

An internal-combustion engine is provided with an exhaust pipe and an exhaust gas catalyst which can be preheated by a burner. Fuel is fed to this burner from a fuel tank by way of a fuel pump. The pressure of approximately 3 bar existing in a first fuel pipe is increased by an output amplifier to approximately 10 bar. The output amplifier comprises a receiving housing and a guide housing, which is arranged therein as well as a differential piston unit comprising a large piston and a small piston. The differential piston unit has a passage bore, through which the fuel flowing into the pressure space of the receiving housing arrives in the high-pressure space of the guide housing. In the event of displacement of the differential piston, which is acted upon by the pressure medium, in one direction, the fuel present in the high-pressure chamber arrives at 10 bar in the second fuel pipe and from there in the burner.

10 Claims, 5 Drawing Sheets

VEHICLE CATALYST EXHAUST SYSTEM FOR AN INTERNAL-COMBUSTION ENGINE

BACKGROUND AND SUMMARY OF THE INVENTION

The present invention relates to an exhaust system, and, more particularly, to a catalytic exhaust system for an internal combustion engine in which a catalyst is preheated by a fuel-operated burner into which fuel is fed from a fuel tank by way of a pump and a fuel pipe.

A burner described in DE-OS 41 34 449 is used for bringing the catalyst to its operating temperature more rapidly and comprises essentially a combustion chamber and a shell housing which surrounds the chamber by means of an annulus into which air is pressed by way of an air feeding pipe. Furthermore, the fuel is fed into the combustion chamber via a fuel pipe and, in the chamber, is absorbed by a fiber glass mat and finally burnt by an electrical ignition device provided on the burner.

Although a burner of this type can be operated by any combustible liquid, as well as by gas, normally the fuel present in the vehicle is used for this purpose which is fed into the combustion chamber by way of an already present vehicle pump at approximately 3 to 4 bar. Since this pressure is relatively low, a relatively poor combustion is caused in the combustion chamber.

In addition, also in the case of a comparatively low delivery pressure of the fuel, the self-emission of the burner is relatively high, particularly at the time of the start of the internal-combustion engine. Naturally, these disadvantages could be avoided by a very high-performance electric pump assigned specifically to the burner. However, this pump is not only relatively heavy and expensive but also requires an additional pressure regulator and an electrical connection. Finally, the electric pump may also generate unpleasant noises.

It is therefore an object of the present invention to provide, in an exhaust system of the aforementioned type, a device by way of which the fuel is fed to the burner with a pressure which ensures an optimal atomization and combustion while doing without an additional pump assigned specifically to the burner.

For achieving this object, the present invention provides an increased pressure in the fuel pipe via an output amplifier. By means of the output amplifier provided in the fuel pipe according to the invention, the fuel pressure existing in this fuel pipe, which normally amounts to approximately 3 bar, can be increased considerably without any additional pump, specifically to approximately 10 bar.

An output amplifier in accordance with the present invention is lower in cost, lighter, sturdier with respect to the operation and considerably quieter than an electric pump which is assigned specifically to the burner, and is therefore correspondingly powerful. The output amplifier of the present invention comprises a differential piston unit whose large and small piston can each be displaced longitudinally in a housing. The housing which surrounds the small piston is connected with the burner so that the fuel is introduced into this burner at the desired high pressure of approximately 10 bar.

The large piston of the differential piston unit is provided in a longitudinally displaceable manner in a hollow-cylindrical receiving housing. A guide housing for receiving the small piston is arranged on an end area by way of a ring flange. One currently contemplated embodiment of the present invention is configured such that the guide housing projects axially from the receiving housing containing the large piston in the area of an end wall, and the small piston also is arranged in this guide housing in a longitudinally displaceable manner. A pressure spring, which acts via prestress upon the large or the small piston is supported on the burner-side end wall of the receiving housing or of the guide housing. When the large piston is not acted upon, this pressure spring will displace the differential piston unit into the area of the end wall of the receiving housing which is provided with the fuel pipe. The small piston always engages in the guide housing. The differential piston unit is penetrated by a center passage bore which changes at the free end of the small piston into a return valve which opens, when the differential piston unit is returned, in the direction of the guide housing. This return valve expediently consists of a spring-loaded ball or similar closing element.

Since a leakage may easily form during the operation of the differential piston unit, the receiving housing is advantageously arranged inside a fuel tank, in which case the pressure chamber of the large piston is connected by way of a fuel pipe with a fuel pipe fed by the fuel pump. The receiving housing, the guide housing and/or the differential piston unit may be made of metal, of a plastic material, or of a ceramic material.

After a cold start, an exhaust gas catalyst is preheated by the burner normally only for approximately one minute. The reason is that, subsequently the operating temperature of the exhaust gas catalyst is maintained by the exhaust gas flow. When the engine is switched off shortly after the cold start, however, fuel must again be fed to the burner for another, or possibly repeated (thus, intervals), preheating of the exhaust gas catalyst. This is achieved by providing a flow valve in the large piston of the differential piston unit, or an axially displaceably arranged control ring in the high-pressure chamber of the guide housing which has at least one lateral passage opening. By virtue of the foregoing, the differential piston unit is, immediately after its sliding-in, slid out again by the admission of pressure medium to the interior end face of the large piston and by the spring effect so that fuel can flow again into the high-pressure chamber of the guide housing. According to the constructive development and design of the output amplifier, this operation may be repeated an arbitrary number of times.

BRIEF DESCRIPTION OF THE DRAWINGS

These and other objects, features and advantages of the present invention will become more readily apparent from the following detailed description thereof when taken in conjunction with the accompanying drawings wherein.

DETAILED DESCRIPTION OF THE DRAWINGS

Figure 1:
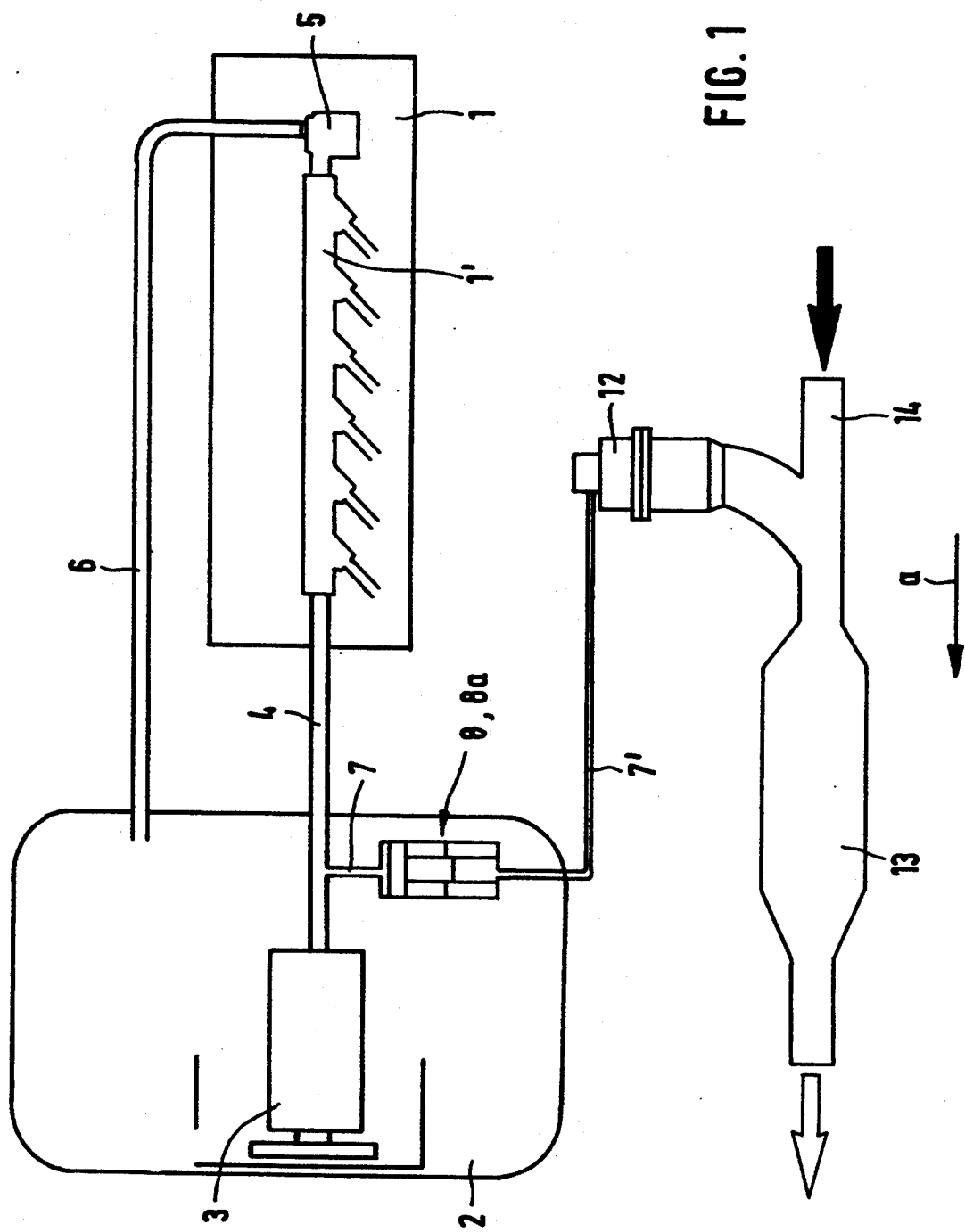
FIG. 1 is a schematic view of the fuel supply system of an internal-combustion engine with a partially shown exhaust system and an output amplifier which is assigned to the burner according to the present invention.

The system for supplying the internal-combustion engine 1 of a passenger car with fuel which is illustrated in FIG. 1 has a fuel tank 2 with an electrically operated fuel pump 3 by which the fuel is delivered by way of a forward flow pipe 4 with a system pressure of approximately 3 bar into the injection strip 1' of the internal-combustion engine 1. On the end area of the injection strip 1', a pressure regulator 5 is provided with which the return flow pipe 6 is connected which, in turn, leads into the fuel tank 2. A first fuel pipe 7 branches off the forward flow pipe 4 and is connected with a hollow-cylindrical receiving housing 8 arranged inside the fuel tank 2.

A hollow-cylindrical longitudinally extending guide housing 9 is concentrically fastened by way of a ring flange 11 (FIG. 2) to the end area of the receiving housing 8 which is situated opposite the fuel pipe 7. A second fuel pipe 7' leads from the guide housing 9 to a burner 12. This burner 12 is in a flow connection with an exhaust gas catalyst 13 which, in turn, is provided in an exhaust pipe 14 of the internal-combustion engine 1.

From there, the exhaust gases flow through the exhaust gas catalyst 13 in the direction of the arrow a as seen in FIG. 1. The fuel which flows from the forward-flow pipe 4 by way of fuel pipes 7 and 7' as well as the receiving housing 8 into the burner 12 is burnt during the starting of the internal-combustion engine 1 by an electrical ignition device provided on the burner 12 and, as a result, the exhaust gas catalyst 13 is preheated for a period of approximately one minute. Subsequently, the operating temperature of the exhaust gas catalyst 13 is maintained by the exhaust gas flow of the exhaust pipe 14.

Figure 2:
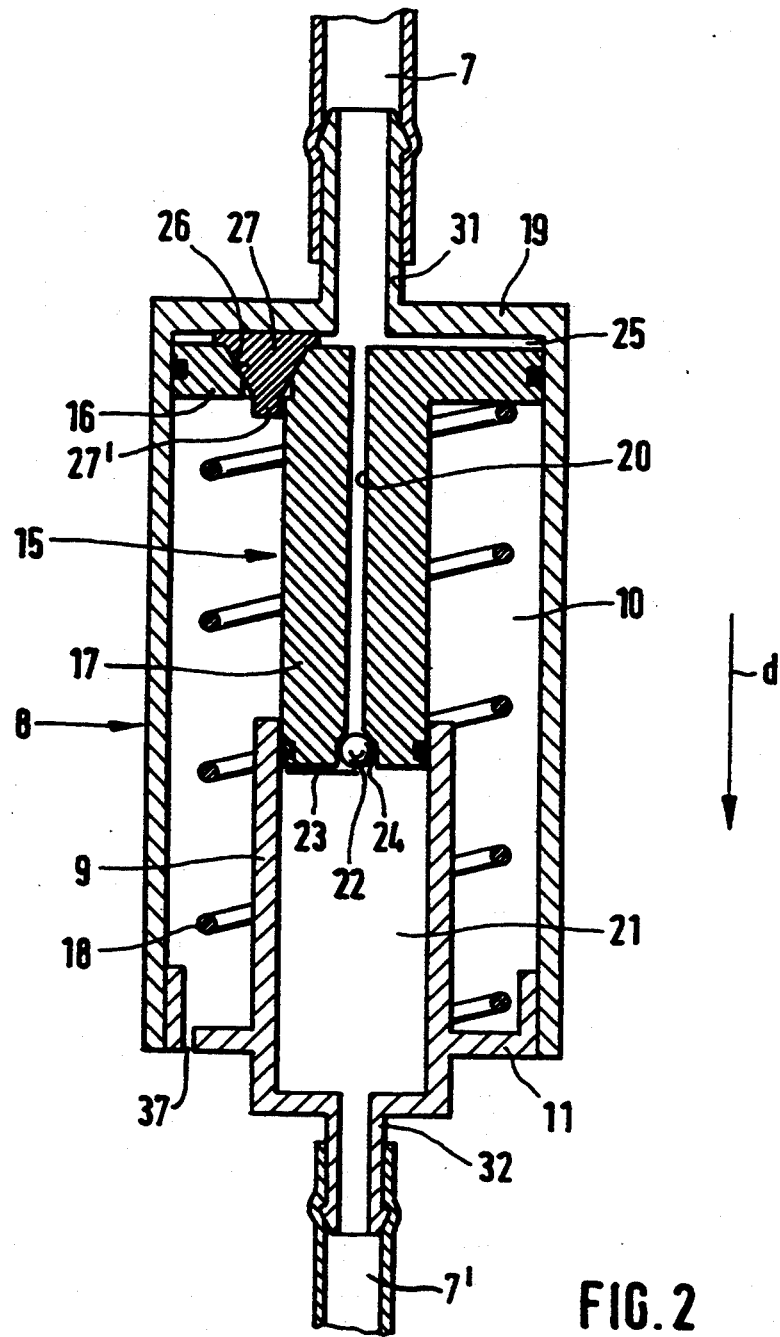
FIG. 2 is a longitudinal cross-sectional view of a receiving housing of the output amplifier used in FIG. 1 with a differential piston unit in its starting position.
Figure 3:
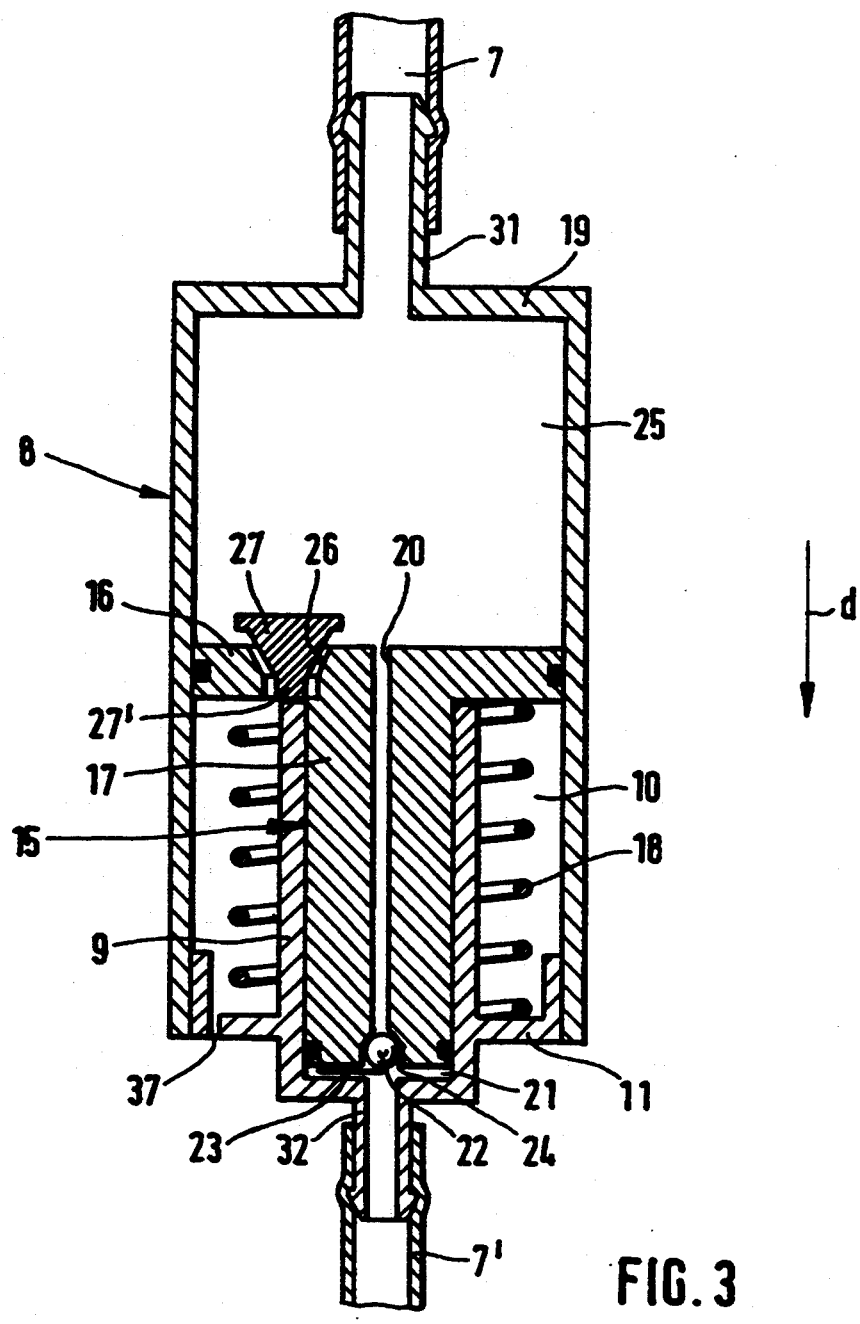
FIG. 3 is a view of a receiving housing corresponding to FIG. 2 in the end position of the differential piston unit being acted upon by the pressure medium and while the flow valve is open.

As illustrated in FIGS. 2 and 3, the, large piston 16 of a differential piston unit 15 is arranged in a longitudinally displaceable manner in the hollow-cylindrical receiving housing 8, and a small piston 17 projects axially in a concentrical manner from the large piston 16. This small piston 17 is, in turn, longitudinally slidably arranged in the guide housing 9. A pressure spring 18 which acts by way of prestress against the opposite end face of the large piston 16 is supported on the ring flange 11. The large piston 16 is displaced by the effect of the pressure spring 18 to close to the end wall 19 of the receiving housing 8 which is provided with the fuel pipe 7 by way of a connection tube 31.

Furthermore, a connection tube 32 projects, from the end wall of the guide housing 9, and the second fuel pipe 7' is mounted on this connection tube 32. The differential piston unit 15 is penetrated by a center passage bore 20 which leads out on the free end of the small piston 17 into a return valve which opens in the direction of the high pressure chamber 21 of the guide housing 9. The return valve has a ball 22 which, in the non-operative position, is pressed by a leaf spring 23 fastened on the end face of the small piston 17 against the bottom of a recess 24 which is formed on the free end area of the small piston 17 and into which the passage bore 20 leads.

FIGS. 2 and 3 show that the large piston 16 of the differential piston unit 15 is penetrated by a bore 26 which widens toward the end wall 19 in the shape of a funnel and into which a flow valve 27 is inserted in an axially displaceable manner. In the non-operative position, the flow valve 27 rests on the exterior end face of the large piston 16 which faces the end wall 19 of the receiving housing 8 (as seen in FIG. 2), and has a projection 27' which projects beyond its interior end face and which, in the area of the end position of the large piston 16 which is acted upon by the pressure medium (as seen in FIG. 3), interacts with the end face of the guide housing 9 such that the flow valve 27 is lifted off the bore 26. Because of the annular gap formed as a result between the flow valve 27 and the bore 26, a flow connection exists between the pressure chamber 25 of the receiving housing 8 and its spring chamber 10.

Figure 4:
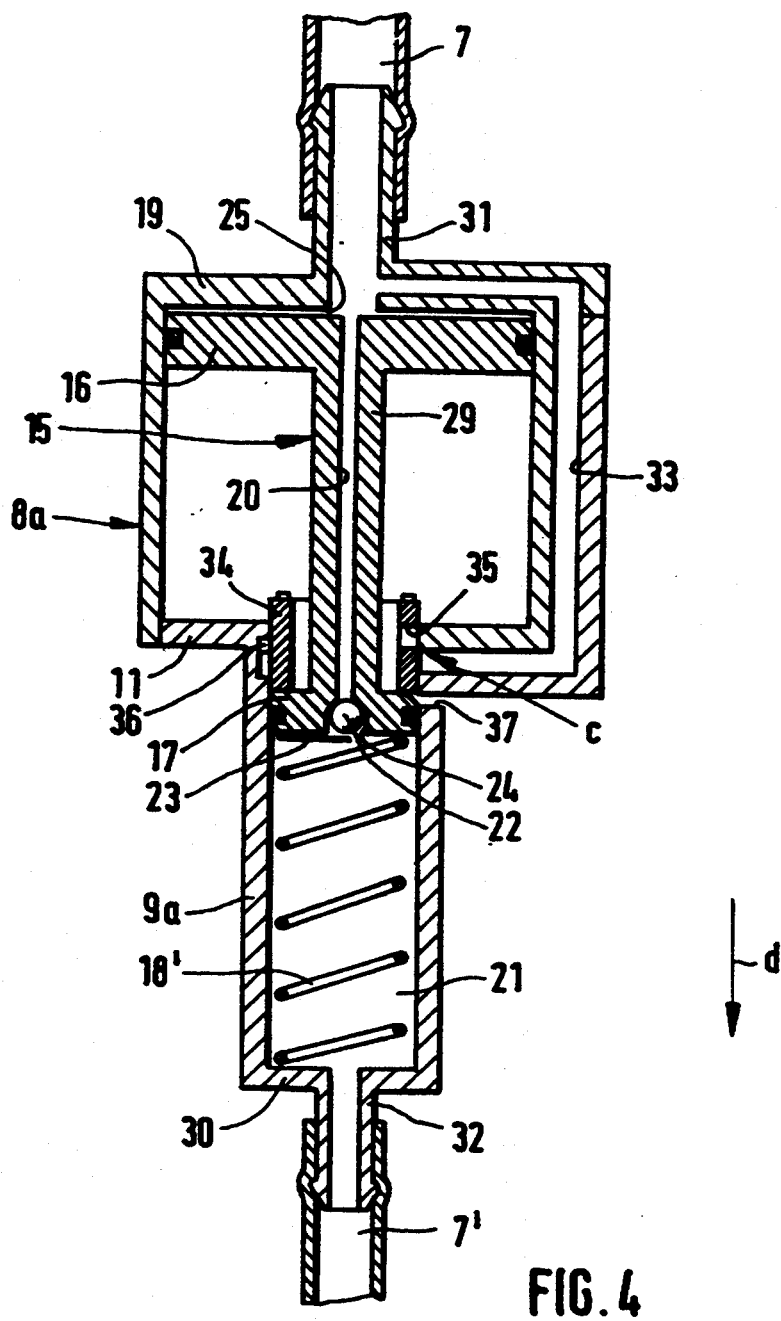
FIG. 4 is a modified embodiment of a receiving housing in the starting position of the differential piston unit.
Figure 5:
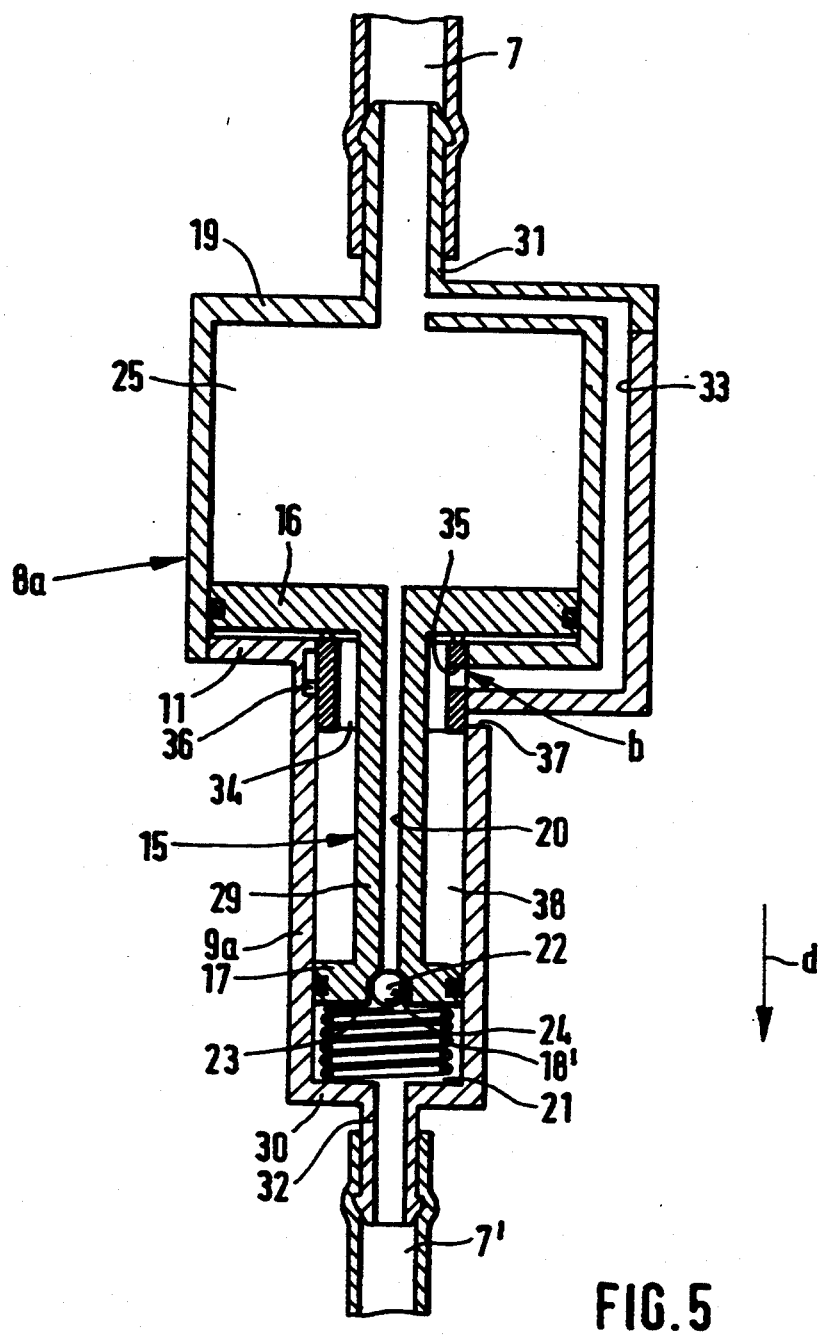
FIG. 5 is a view of the receiving housing corresponding to FIG. 4 with the differential piston unit which is in its end position being acted upon by the pressure agent and with the control ring which is displaced in the opening position.

The receiving housing 8a illustrated in FIGS. 4 and 5 has largely the same construction as the receiving housing 8 as in FIGS. 2 and 3. For this reason, respective identical parts are marked by the same reference numbers and a description thereof is dispensed with. The small piston 17 of the differential piston unit 15 is, however, constructed on a holding projection 29 which projects in the center away from the large piston 16. The holding projection 29 has a much smaller diameter than the small piston 17. The hollow-cylindrical guide housing 9a projects axially toward the outside from the ring flange 11, in which case the pressure spring 18' is supported on the end wall 30 of the guide housing 9a facing the burner 12. The pressure spring 18' acts by way of prestress against the small piston 17. In addition, a connection pipe 32 for the fuel pipe 7' is provided on the end wall 30.

Furthermore, a flow duct 33 is constructed on the receiving housing 8a which branches off the area of the leading-in of the connection tube 31 of the first fuel pipe 7 into the pressure space 25, extends along a side wall of the receiving housing 8a and finally leads into the high-pressure chamber 21 of the guide housing 9a (opening position b of the control ring 34). A control ring 34 is situated in the mouth area of the flow duct 33 which surrounds the holding projection 29 of the differential piston unit 15 at a large radial distance and which has a radially extending passage opening 35.

The control ring 34 can be axially displaced by way of its circumferential wall along the wall of the high-pressure chamber 21 of the guide housing 9a between an opening position b (FIG. 5) and a closing position c (FIG. 4). For this purpose, a guiding nose 36 projects radially away from the control ring 34 and engages in an assigned longitudinally extending recess of the guide housing 9a.

When no liquid pressure exists in the pressure space 25 of the receiving housing 8a, the large piston 16 of the differential piston unit 15 is displaced by the effect of the pressure spring 18' to close to the end wall 19 of the receiving housing 8a. As a result, the control ring 34 is also displaced into its closing position c in which it sealingly covers the mouth of the flow duct 33 into the high pressure chamber 21 of the guide housing 9a (FIG. 4). When the large piston 16 of the differential piston unit 15 is displaced into its end position by being acted upon by the pressure medium, however (as will be explained below), it also causes the displacement of the control ring 34 into its opening position b in which the fuel can flow via the flow duct 33 and the passage opening 35 of the control ring 34 into an annulus 38 of the guide housing 9a, as illustrated in FIG. 5.

The receiving housing 8 and 8a provided with the differential piston unit 15 forms, together with the guide housing 9 and 9a, a output amplifier, in which case the fuel flowing into the receiving housing 8 and 8a at approximately 3 bar is increased to approximately 10 bar for the introduction into the burner 12. In this case, the large piston 16 may, for example, have a diameter of approximately 50 mm, while the small piston 17 may, for example, have a diameter of approximately 20. The receiving housing 8 and 8a and the differential piston unit 15, completely or partly, and the respective individual component parts may be made of a plastic, metallic or ceramic material. Naturally, the receiving housing 8 may also be provided without the flow valve 27, and the receiving housing 8a can also be provided without the control ring 34. During the displacement of the differential piston unit 15, the fuel can finally flow off into the fuel tank 2 via an opening 37 provided on the receiving housing 8 and 8a.

The method of operation of the output amplifier according to the invention with respect to FIGS. 1 to 5 is as follows:

After the starting of the internal-combustion engine 1, a fuel from a fuel tank 2 is fed by the fuel pump 3 into the forward flow pipe 4, and the existing pressure is controlled by the pressure regulator 5. This pressure amounts to approximate 3 bar. At the same time, by way of the first fuel pipe 7, the fuel is also fed into the pressure chamber 25 of the receiving housing 8 (FIG. 2), and, as a result, the large piston 16 of the differential piston unit 15 is displaced against the effect of the pressure spring 18 in the direction of the arrow d (FIG. 3).

The surface relationships of the large piston 16 and of the small piston 17 are coordinated with one another such that the fuel which flowed into the high-pressure chamber 21 during the shifting of the differential piston unit 15 against the direction of the arrow d through the passage bore 20 and, while the return valve (ball 22) was open, as explained below, is increased to a pressure of approximately 10 bar when the differential piston unit 15 is displaced further in the direction of the arrow d. By way of this pressure, the fuel by way of the second fuel pipe 7' finally arrives in the burner 12 which is equipped with a temperature sensor to measure the preheating temperature of the exhaust gas catalyst 13 that is to be reached. When this temperature is reached, the sensor switches off the burner 12. Depending on the existing outside temperature, the preheating time of the exhaust gas catalyst 13 after a cold start amounts to approximately one minute.

In the area of the end position of the large piston 16 in which is it acted upon by the pressure medium and which is shown in FIG. 3, the interior end face of the large piston 16 is situated close to the facing end face of the guide housing 9, whereby the flow valve 27 is pushed back by way of its projection 27' so that an annulus forms between it and the bore 26 so that the fuel can now flow into the spring chamber 10 of the receiving housing 8.

As a result of the flow pressure existing in the spring chamber 10, the rear of the large piston 16 is acted upon by pressure so that it is pushed out thereby and by the effect of the relaxing pressure spring 18 against the direction of the arrow d, and finally reaches the end position illustrated in FIG. 2. Then, the flow valve 27 is also closed. In this operation during the displacement of the differential piston unit 15 against the direction of the arrow d, fuel thus flows through the passage bore 20 of the differential piston unit 15, and in the process the ball 22 is lifted off the bottom of the recess 24 against the effect of the leaf spring 23 so that the fuel can flow into the high-pressure chamber 21 of the guide housing 9.

When the differential piston unit 16 is, however, again displaced in the direction of the arrow d, the ball 22 is pressed under the effect of the leaf spring 23 and by the fuel present in the high-pressure chamber 21 against the bottom of the recess 24; thus, the return valve is shut. By a repeated displacing of the differential piston unit 15, fuel from the high-pressure chamber 21 of the receiving housing 8 and the second fuel pipe 7' can repeatedly be fed into the burner 12. Its temperature sensor will respond when the preheating temperature of the exhaust gas catalyst 13 is reached and thereby will simultaneously close the fuel feeding valve in the burner 12. As a result, a fluid back-pressure will build up in the second fuel pipe 7' so that the differential piston unit 15 will remain in its respective sliding direction in the receiving housing 8. When the differential piston unit 15 is displaced, the fuel can flow by way of the opening 37 out of the spring chamber 10 into the fuel tank 2.

The receiving housing 8a with the differential piston unit 15 illustrated in FIGS. 4 and 5 has largely the same function as the receiving housing 8 explained with respect to FIGS. 2 and 3. Therefore, only the functional differences are hereinafter explained in describing the operation of the receiving housing 8a. When the fuel flows by way of the first fuel pipe 7 into the pressure space 25 of the receiving housing 8a, the differential piston unit 15 is displaced against the effect of the pressure spring 18' in the direction of the arrow d, in which case the control ring 34 is in its closing position c and therefore the fuel flowing into the flow duct 33 cannot flow off.

When the interior end face of the large piston 16 rests on the facing end face of the control ring 34, however, the control ring 34 is, when the differential piston unit 15 is displaced further, displaced into the opening position b illustrated in FIG. 5 so that, in the end position of the differential piston unit 15 (FIG. 5), fuel also flows in by way of the flow duct 33 and the passage opening 35 into the annulus 38 of the guide housing 9a. By virtue of the pressure of the fuel existing in the annulus 38 and because of the effect of the relaxing pressure spring 18', the differential piston unit 15 is shifted back in the direction of the arrow d into the starting position illustrated in FIG. 4. The return valve (ball 22) provided on the small piston 17 is opened and closed analogously to the return valve of the receiving housing 8. If the receiving housing 8 or 8a is not provided with the flow valve 27 or with the control ring 34, after a cold start of the internal-combustion engine 1, the high-pressure chamber 21 can be filled with fuel only once.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. An exhaust system for an internal-combustion engine of a vehicle, comprising a fuel tank, a fuel-operated burner, and a catalyst operatively configured to be preheated by the fuel-operated burner into which the fuel is fed from the fuel tank via a pump and a fuel pipe fed by the pump, wherein a self-actuated output amplifier is operatively arranged between the pump and the burner to increase pressure in the fuel pipe.

2. The exhaust system according to claim 1, wherein the output amplifier is sized to increase the pressure to approximately 10 bar.

3. The exhaust system according to claim 1, wherein the output amplifier comprises a differential piston unit and housings surrounding large and small pistons, respectively, and one of the housings surrounding the small piston is connected with the burner.

4. The exhaust system according to claim 3, wherein in the large piston of the differential piston unit is adapted to be longitudinally displaced in the other of the housings configured as a hollow-cylindrical receiving housing, having a ring flange in an end area of which facing the small piston, and provided with the one housing configured as a longitudinally extending guide housing for the small piston.

5. The exhaust system according to claim 4, wherein a pressure spring is supported on one of the ring flange and a burner-side end wall of the guide housing and is arranged to act upon one of the large piston and the small piston by prestress and by way of which, in a non-operative position, the large piston is displaced into an area of a facing end wall of the receiving housing, and the small piston projects into the guide housing.

6. The exhaust system according to claim 4, wherein the differential piston unit has a center passage bore which, on a free end of the small piston, is configured as a return valve opening in a direction of the guide housing and is adapted to be selectively adjusted.

7. The exhaust system according to claim 6, wherein the passage bore communicates with a recess formed on a free end area of the small piston, and a ball-like closing element is operatively arranged to be pressed in a spring loaded manner against a bottom of the recess in the non-operative position.

8. The exhaust system according to claim 4, wherein the receiving housing is arranged inside a fuel tank, a pressure chamber of the large piston being connected via a second fuel pipe with a fuel pipe fed by the fuel pump.

9. The exhaust system according to claim 6, wherein the large piston has a bore is penetrated by at least one axially displaceable flow valve configured to rest, in the non-operative position, on an exterior end face of the large piston and project beyond an interior end face facing the guide housing, the flow valve, in an area of the end position of the large piston acted upon by the pressure medium, interacts with the facing end face of the guide housing and is displaced backwardly, and an annular gap is formed between the flow valve and the bore receiving the flow valve.

10. The exhaust system according to claim 8, wherein the small piston is formed on a holding projection configured to project centrally from the large piston and having a diameter smaller than the diameter of the small piston, the holding projection being surrounded at a radial distance therefrom by a control ring arranged to displaceable along a wall of a high-pressure chamber of the guide housing between an opening position and a closing position, which control ring has at least one radially extending passage opening, the receiving housing being provided with at least one flow duct branching off an area of the lead-in of the second fuel pipe into the receiving housing and leading into the high-pressure chamber in the opening position of the control ring, whereby during displacement of the large piston in proximity to a facing end wall of the receiving housing, a mouth of the flow duct into the high-pressure chamber is covered by the displacement of the control ring into a closing position thereof and, in the case of the displacement of the differential piston into an end position thereof acted upon by the pressure medium, the control ring is displaced by the large piston into its opening position, in which the fuel flows via the flow duct and the passage opening of the control ring into an annulus of the guide housing.

* * * * *